United States Patent
Yoshida et al.

(10) Patent No.: US 11,790,513 B2
(45) Date of Patent: Oct. 17, 2023

(54) DEFECT INSPECTION APPARATUS AND DEFECT INSPECTION METHOD

(71) Applicant: Shimadzu Corporation, Koyo (JP)

(72) Inventors: Koki Yoshida, Kyoto (JP); Takahide Hatahori, Kyoto (JP); Kenji Takubo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 262 days.

(21) Appl. No.: 17/601,900

(22) PCT Filed: Apr. 17, 2019

(86) PCT No.: PCT/JP2019/016519
§ 371 (c)(1),
(2) Date: Oct. 6, 2021

(87) PCT Pub. No.: WO2020/213101
PCT Pub. Date: Oct. 22, 2020

(65) Prior Publication Data
US 2022/0180500 A1    Jun. 9, 2022

(51) Int. Cl.
*G06T 7/00* (2017.01)
*G01N 29/06* (2006.01)
(Continued)

(52) U.S. Cl.
CPC ....... *G06T 7/0004* (2013.01); *G01N 29/0663* (2013.01); *G01N 29/2418* (2013.01); *G06F 3/14* (2013.01)

(58) Field of Classification Search
CPC ............. G06T 7/0004; G01N 29/0663; G01N 29/2418; G06F 3/14
(Continued)

(56) References Cited

U.S. PATENT DOCUMENTS 6,057,927 A * 5/2000 Levesque ............... G01K 17/02
356/451
7,278,315 B1 * 10/2007 Klein ................... G01N 29/221
73/598
(Continued)

FOREIGN PATENT DOCUMENTS

| JP | 2012-024196 A | 2/2012 |
| JP | 2017-219318 A | 12/2017 |
| WO | 2017/221324 A | 12/2017 |

OTHER PUBLICATIONS

Written Opinion by the International Search Authority for PCT application No. PCT/JP2019/016519 dated Jul. 16, 2019, submitted with a machine translation.

(Continued)

*Primary Examiner* — Trang U Tran
(74) *Attorney, Agent, or Firm* — Muir Patent Law, PLLC

(57) ABSTRACT

This defect inspection apparatus (100) is provided with an excitation unit (1), a laser illumination unit (2), an interference unit (3), an imaging unit (35), and a control unit (4) for generating a moving image (61) related to the propagation of an elastic wave of an inspection target (7). The control unit is configured to perform control to display an identified measurement inappropriate region (81) in such a manner as to be distinguishable from a measurement appropriate region (82) in which the vibration state has been correctly acquired in the moving image (61).

19 Claims, 6 Drawing Sheets

(51) Int. Cl.
*G01N 29/24* (2006.01)
*G06F 3/14* (2006.01)

(58) Field of Classification Search
USPC .......................................................... 348/92
See application file for complete search history.

(56) References Cited

U.S. PATENT DOCUMENTS

| | | | |
|---|---|---|---|
| 9,194,842 B2* | 11/2015 | Singh | G01N 29/0654 |
| 9,262,840 B2* | 2/2016 | Schreier | G06T 7/579 |
| 9,423,356 B2* | 8/2016 | Ogawa | G02B 26/10 |
| 9,436,990 B2* | 9/2016 | Otani | G01N 21/956 |
| 9,865,046 B2* | 1/2018 | Urano | G06T 7/33 |
| 10,267,618 B2* | 4/2019 | Hatahori | G01M 7/00 |
| 10,593,062 B2* | 3/2020 | Otani | G03F 7/7065 |
| 2017/0350690 A1 | 12/2017 | Hatahori et al. | |
| 2019/0204275 A1 | 7/2019 | Hatahori et al. | |

OTHER PUBLICATIONS

Nakajima et al., "Vibration Analysis by Holography", Applied Physics vol. 41, No. 6 (1972) pp. 560 (20)-573 (33), Received Apr. 25, 1972, submitted with a machine translation.

\* cited by examiner

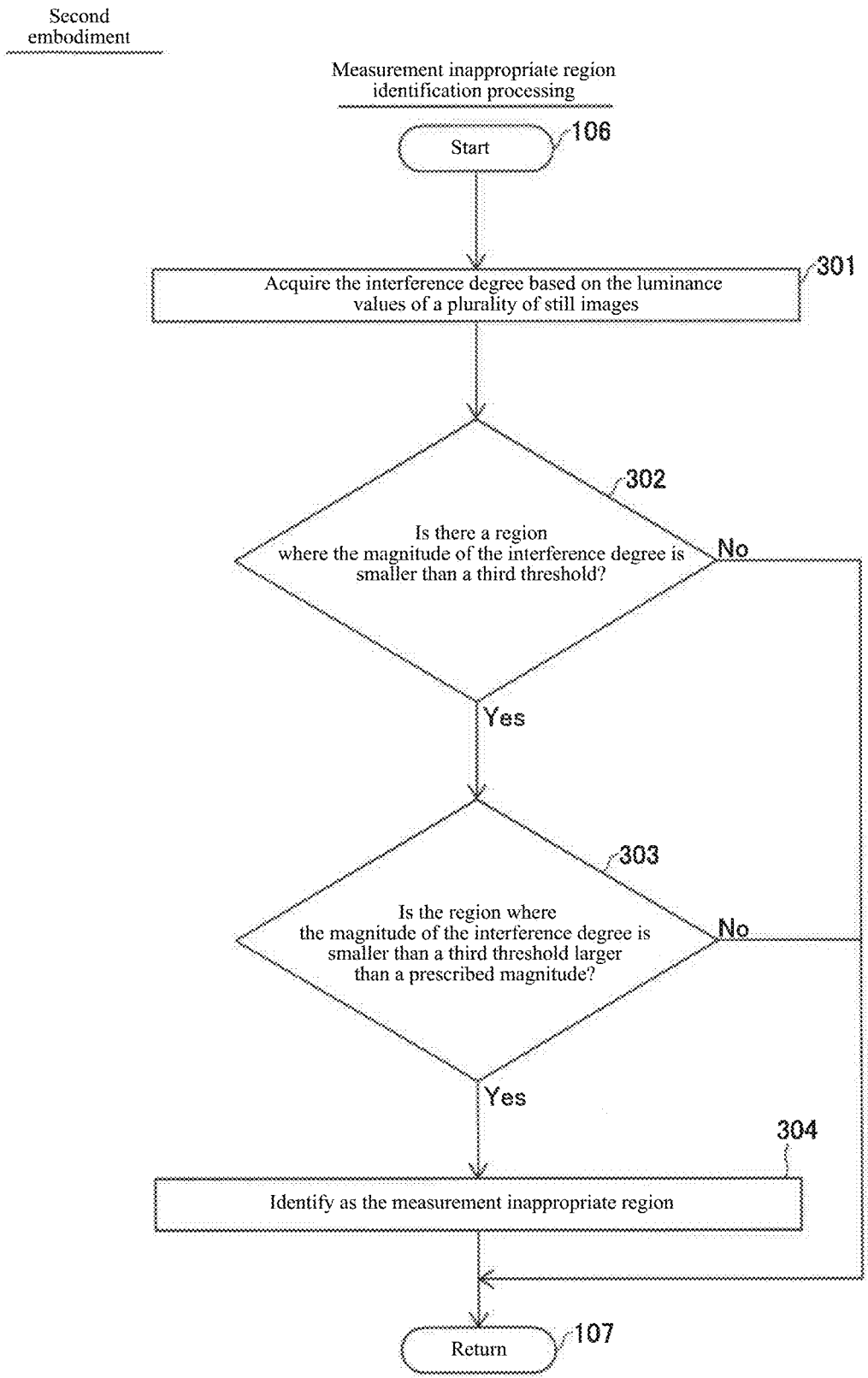

DEFECT INSPECTION APPARATUS AND DEFECT INSPECTION METHOD

TECHNICAL FIELD

The present invention relates to a defect inspection apparatus and a defect inspection method.

BACKGROUND OF THE INVENTION

Conventionally, a defect inspection apparatus is known. A defect inspection apparatus is disclosed in, for example, Japanese Unexamined Patent Application Publication No. 2017-219318.

Japanese Unexamined Patent Application Publication No. 2017-219318 discloses a defect inspection apparatus provided with an excitation unit for exciting an elastic wave to a measurement target (inspection target), an illumination unit for performing stroboscopic illumination onto a measurement region on a surface of the measurement target (inspection target), and a displacement measurement unit. The displacement measurement unit is configured to control the phase of the elastic wave and the timing of the stroboscopic illumination and collectively measure the front-back displacement of each measurement region point in at least three phases of the elastic wave that differ from each other. Further, Japanese Unexamined Patent Application Publication No. 2017-219318 discloses a configuration in which a defect inspection apparatus collectively measures the front-back displacement of each measurement region point by using speckle-shearing interferometry in each phase of the elastic wave. Further, it also discloses a configuration in which a defect inspection apparatus generates an image in which the difference in the displacement due to vibrations is expressed by the difference in the brightness of the image based on the vibration state (amplitude and phase) of each point of a measurement region and detects the discontinuous portion of the vibration state as a defect by visually confirming the generated image by an inspector. Here, the speckle-shearing interferometry is a technique to detect a relative displacement between two points by causing laser light reflected at two different points of a measurement region to interfere with each other and acquiring the phase of the interference light.

PRIOR ART DOCUMENT

Patent Document

Patent Document 1: Japanese Unexamined Patent Application Publication No. 2017-219318

SUMMARY OF THE INVENTION

Problems to be Solved by the Invention

In the defect inspection apparatus described in Japanese Unexamined Patent Application Publication No. 2017-219318, an elastic wave is excited to a measurement target (inspection target) and stroboscopic illumination is irradiated. Then, in each phase of the elastic wave, the light reflected at two different points in the measurement region is caused to interfere with each other in each phase of the elastic wave, and the image by the interference light is acquired as a still image. Here, while shifting one of phases of the interfered laser light, the image by the interference light is acquired as a plurality of still images. Then, the phase of the interference light is calculated from the luminance change of the plurality of still images. Then, the relative displacement between the two points is acquired from the phase of this interference light. The vibration state (amplitude and phase) of the measurement region is acquired by performing the above-described processing at each point in the measurement region. In the series of steps, in a case where the luminance change in the plurality of still images cannot be captured due to the fact that the light quantity of the interference light is insufficient or excessive, in some cases, the phase of the interference light may not be correctly calculated. Further, even in a case where the measurement target is moving while acquiring a still image due to disturbance vibrations that are not vibrations by the elastic wave, in some cases, the phase of the interference light may not be correctly calculated. In such cases, there occurs a region in which the vibration state (amplitude and phase) cannot be acquired correctly within a measurement region.

The image to be generated by the defect inspection apparatus described in Japanese Unexamined Patent Application Publication No. 2017-219318 is an image in which the difference in the displacement due to vibrations is shown by the difference in the brightness of the image. In this image, it is possible to observe the vibration state (amplitude and phase) of each point in the measurement region of the measurement target (inspection target). However, it is difficult to grasp at a glance whether or not the vibration state has been correctly acquired for each measurement region of the measurement target (inspection target). In a case where the vibration state has not been acquired correctly for each measurement region of the measurement target (inspection target), the defective portion and the normal portion are incorrectly determined. For this reason, a defect inspection apparatus that can easily grasp whether or not a vibration state has been correctly acquired for each measurement region of a measurement target (inspection target) has been desired.

The present invention has been made to solve the aforementioned problems. It is an object of the present invention to provide a defect inspection apparatus and a defect inspection method which can easily grasp whether or not a vibration state has been correctly acquired for each measurement region of an inspection target.

Means for Solving the Problem

In order to attain the above-described object, a defect inspection apparatus according to a first aspect of the present invention is provided with:

an excitation unit configured to excite an elastic wave to an inspection target;

a laser illumination unit configured to emit laser light onto the inspection target;

an interference unit configured to cause laser light reflected at different positions of the inspection target excited by the excitation unit to interfere with each other;

an imaging unit configured to acquire an image of the interfered laser light; and a control unit configured to acquire a vibration state based on a plurality of still images acquired by the imaging unit and generate a moving image related to propagation of an elastic wave of the inspection target, wherein the control unit is configured to perform control to identify a measurement inappropriate region in which the vibration state has not been correctly acquired, based on an imaging result by the imaging unit and display the measurement inappropriate region in such a manner as to be distinguishable from a measurement appropriate region.

In the defect inspection apparatus according to the first aspect of the present invention, as described above, it is provided with the control unit configured to display the measurement inappropriate region in such a manner as to be distinguishable from the measurement appropriate region in the moving image. With this, it becomes possible for the user to confirm the moving image in which the measurement inappropriate region and the measurement appropriate region are displayed in a distinguishable manner. Therefore, the user can easily identify and grasp the measurement inappropriate region and the measurement appropriate region in the above-described moving image. Consequently, the user can easily grasp whether the vibration state has been correctly acquired for each measurement region of the inspection target. Further, the user can easily grasp the measurement inappropriate region based on the imaging result. Thus, it is possible to discriminate between the measurement inappropriate region and the measurement appropriate region, and therefore it is possible to suppress the measurement inappropriate region in which the elastic wave propagation has not been observed from being erroneously recognized as a defective portion. Further, the user can make a determination as to whether or not to retake the measurement depending on the size of the measurement inappropriate region or the like.

In the defect inspection apparatus according to the first aspect of the present invention, preferably, the control unit is configured to perform control to identify a region in which a light quantity of the interfered laser light acquired by the imaging unit is insufficient or excessive to correctly acquire the vibration state by the control unit, as the measurement inappropriate region. With this configuration, in a case where the above-described region has occurred in the measurement region due to the shape, the surface condition, etc., of the inspection target, it is possible to identify the above-described region as a measurement inappropriate region.

In this case, preferably, the control unit is configured to perform control to identify a region in which a luminance value in each of the plurality of still images is smaller than a first threshold or a region in which a luminance value in each of the plurality of still images is larger than a second threshold which is larger than the first threshold, as the measurement inappropriate region. With this configuration, it is possible to easily identify the region in which each luminance value of the plurality of still images is smaller than the first threshold as a measurement inappropriate region, which is a region in which the light quantity of the laser light is insufficient. Further, it is possible to easily identify the region in which each luminance value of the plurality of still images is greater than the second threshold as a measurement inappropriate region, which is a region in which the light quantity of laser light is saturated.

In the defect inspection apparatus according to the first aspect of the present invention, preferably, the control unit is configured to perform control to determine whether or not a luminance change rate with respect to an average luminance in each pixel of the plurality of still images has been reduced based on the plurality of still images and identify a region in which the luminance change rate has been reduced, as the measurement inappropriate region. With this configuration, in a case where a region in which the luminance change rate is low in the measurement region has occurred due to the fact that vibrations from other than an excitation unit have been applied to the inspection target, the control unit can be identified the region in which the luminance change rate is low as a measurement insufficient region.

In this case, preferably, the control unit is configured to perform control to identify a region in which the luminance change rate is smaller than a predetermined threshold as the measurement inappropriate region. With this configuration, it is possible to easily identify the region in which the luminance change rate is lower than a predetermined threshold as a measurement inappropriate region.

In the configuration of performing the control to identify the region in which the luminance change rate is low as the measurement inappropriate region, preferably, the control unit is configured to perform control to discriminate between the measurement inappropriate region and the measurement appropriate region, based on a size of the region in which the luminance change rate has been reduced. With this configuration, it is possible to suppress that the region in which the luminance change rate has been locally reduced is determined as a measurement inappropriate region, and therefore, it is possible to suppress overlooking a defective portion.

In this case, preferably, the control unit is configured to perform control to identify the region in which the luminance change rate has been reduced is larger than a predetermined size, as the measurement inappropriate region when the size of the region in which the luminance change rate has been reduced is larger than the predetermined size. The region in which the luminance change rate decreases due to the fact that vibrations from other than an excitation unit are applied is usually larger than the size of the defective portion. Therefore, with this configuration, by comparing the size of the region in which the luminance change rate has been reduced with a predetermined size, it becomes possible to easily identify a measurement inappropriate region. Consequently, in a case where the luminance change rate has been reduced by the increase in the amplitude at a defective portion due to vibrations excited to the inspection target, it is possible to suppress a defective portion from being determined as a measurement inappropriate region.

In the defect inspection apparatus according to the first aspect of the present invention, preferably, the control unit is configured to display the measurement inappropriate region and the measurement appropriate region in such a manner as to be distinguishable by displaying the measurement inappropriate region with a color different from a color of the measurement appropriate region. With this configuration, the measurement inappropriate region and the measurement appropriate region are displayed in different colors, and therefore the user can easily visually distinguish between the measurement inappropriate region and the measurement appropriate region.

In the defect inspection apparatus according to the first aspect of the present invention, the control unit is configured to perform control to display that a measurement itself has not been established when a ratio of the measurement inappropriate region to an entire imaging region has exceeded a predetermined value. With this configuration, it is displayed that the measurement itself has not been not established, and therefore the user can easily recognize that the measurement has not been established. As a result, the usability of the user can be improved.

In order to attain the above-described object, a defect inspection method according to a second aspect of the present invention includes the steps of:
 exciting an elastic wave to an inspection target;
 irradiating the inspection target with laser light;
 causing laser light reflected at mutually different positions of the excited inspection target to interfere with each other;

acquiring an image by the interfered laser light;

acquiring a vibration state based on a captured still image and generating a moving image related to propagation of the elastic wave of the inspection target;

identifying a measurement inappropriate region in which the vibration state has not been correctly acquired, based on an imaging result; and displaying the measurement inappropriate region in the moving image in such a manner as to be distinguishable from a measurement appropriate region.

In the defect inspection method according to the second aspect of the present invention, as described above, the control is performed to display the measurement inappropriate region in the moving image in such a manner as to be distinguishable from the measurement appropriate region in which vibration state has been correctly acquired. As a result, it is possible to provide a defect inspection method capable of easily grasping whether or not the vibration state has been correctly acquired for each measurement region of the inspection target, in the same manner as in the defect inspection apparatus according to the above-described first aspect of the present invention.

Effects of the Invention

As described above, according to the present invention, it is possible to provide a defect inspection apparatus and a defect inspection method capable of easily grasping whether or not a vibration state has been correctly acquired for each measurement region of an inspection target.

BRIEF DESCRIPTION OF THE DRAWINGS

FIG. 6 is a flowchart for explaining measurement inappropriate region identification processing by a control unit of a defect inspection apparatus according to a second embodiment.

EMBODIMENTS FOR CARRYING OUT THE INVENTION

Hereinafter, some embodiments in which the present invention is embodied will be described with reference to the attached drawings.

First Embodiment

Figure 1:
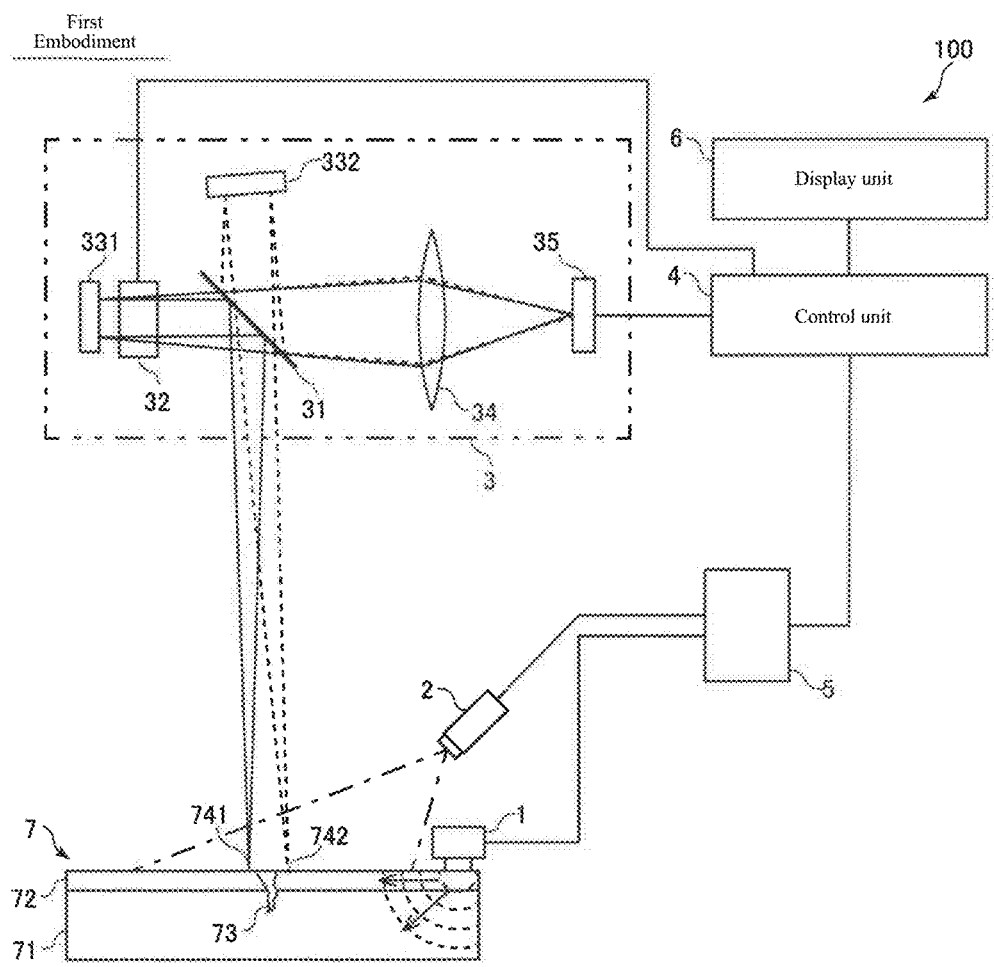
FIG. 1 is a block diagram showing a configuration of a defect inspection apparatus according to a first embodiment.
Figure 2:
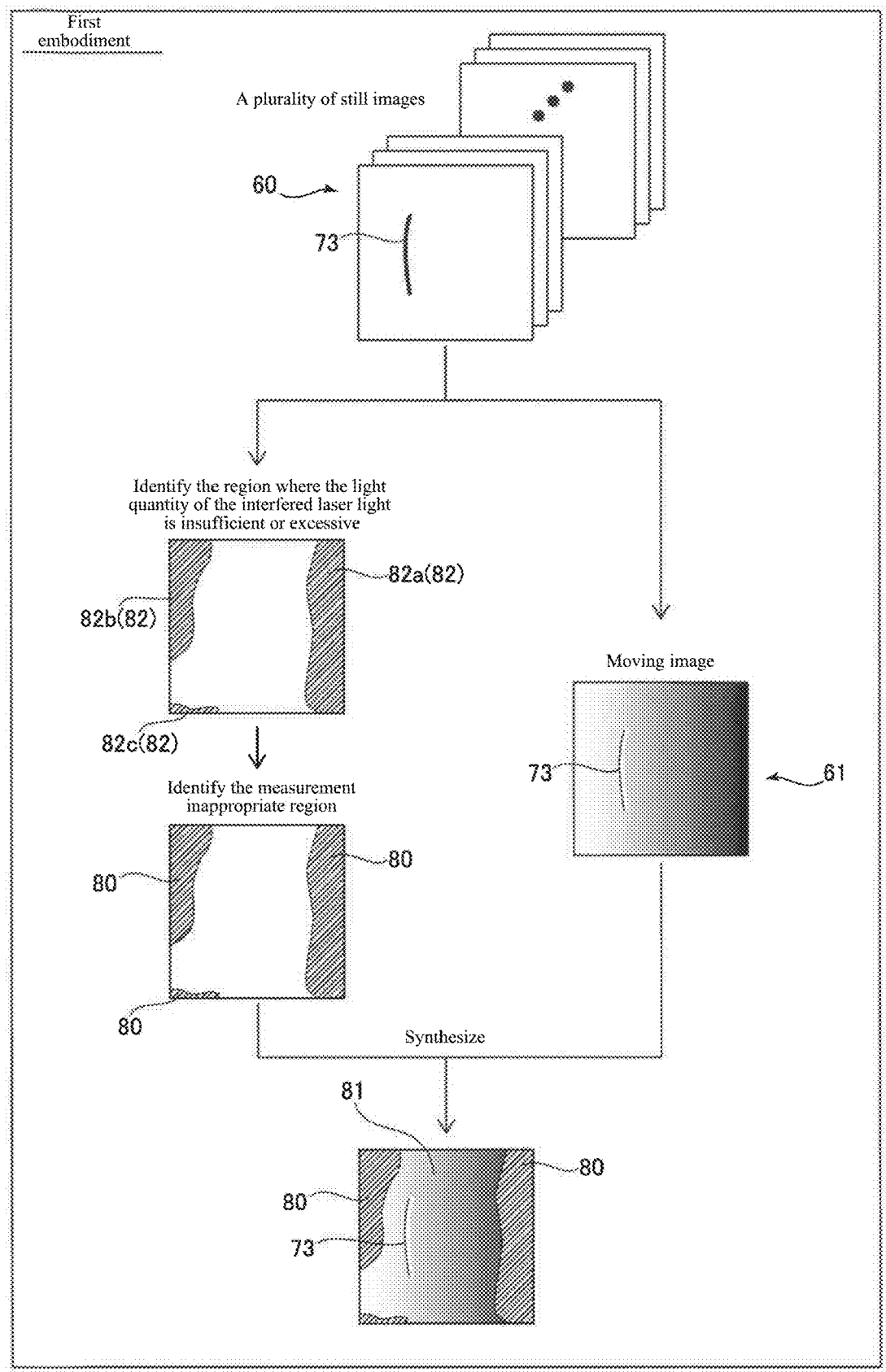
FIG. 2 is a diagram for explaining the displaying of a measurement inappropriate region of a defect inspection apparatus according to a first embodiment.

Referring to FIGS. 1 and 2, the configuration of a defect inspection apparatus 100 according to a first embodiment of the present invention will be described. The defect inspection apparatus 100 is a device for inspecting a defect of an inspection target 7.

(Configuration of Defect Inspection Apparatus)

The defect inspection apparatus 100 according to the first embodiment is provided with a vibrator 1, a laser illumination unit 2, a speckle-shearing interferometer 3, a control unit 4, a signal generator 5, and a display unit 6. Note that the vibrator 1 is one example of the "excitation unit" described in claims. Further note that the speckle-shearing interferometer 3 is one example of the "interference unit" described in claims.

The vibrator 1 and the laser illumination unit 2 are connected to the signal generator 5 via cables. The vibrator 1 excites an elastic wave to the inspection target 7. Specifically, the vibrator 1 is arranged so as to contact the inspection target 7 and is configured to convert the AC electric signal from the signal generator 5 to a mechanical vibration and excite an elastic wave to the inspection target 7.

The laser illumination unit 2 emits the laser light to the inspection target 7. The laser illumination unit 2 includes a laser light source and an illumination light lens (not shown). The illumination light lens emits the laser light emitted from the laser light source so as to be expanded to illuminate the entire measurement region on the surface of the inspection target 7. The laser illumination unit 2 emits laser light at a predetermined timing based on the electric signal from the signal generator 5. That is, the laser illumination unit 2 emits laser light to the inspection target 7 corresponding to the elastic wave by the vibrator 1.

The speckle-shearing interferometer 3 is configured to cause the laser light reflected at different positions of the inspection target 7 excited by the vibrator 1 to interfere with each other. The speckle-shearing interferometer 3 is provided with a beam splitter 31, a phase shifter 32, a first reflecting mirror 331, a second reflecting mirror 332, a condenser lens 34, and an image sensor 35. Note that the image sensor 35 is one example of the "imaging unit" recited in claims.

The beam splitter 31 includes a half mirror. The beam splitter 31 is arranged at a position where the laser light reflected by the surface of the inspection target 7 is incident. Further, the beam splitter 31 reflects the incident laser light toward the phase shifter 32 and transmits the laser light to the second reflecting mirror 332 side. Further, the beam splitter 31 reflects the laser light incident by being reflected by the second reflecting mirror 332 to the condenser lens 34 side and transmits the laser light incident by being reflected by the first reflecting mirror 331 to the condenser lens 34 side.

The first reflecting mirror 331 is arranged at an angle of 45 degrees with respect to the reflection surface of the beam splitter 31 on the optical path of the laser light reflected by the beam splitter 31. The first reflecting mirror 331 reflects the laser light incident by being reflected by the beam splitter 31 to the beam splitter 31 side.

The second reflecting mirror 332 is arranged at an angle slightly inclined from an angle of 45 degrees with respect to the reflection surface of the beam splitter 31 on the optical path of the laser light transmitted through the beam splitter 31. The second reflecting mirror 332 reflects the laser light incident by being reflected by the beam splitter 31 to the beam splitter 31 side.

The phase shifter 32 is arranged between the beam splitter 31 and the first reflecting mirror 331 to change (shift) the phase of the transmitted laser light by the control of the control unit 4. Specifically, the phase shifter 32 is configured to change the optical path length of the laser light that passes therethrough.

The image sensor 35 has a number of detecting elements. The image sensor 35 is placed on an optical path of the laser light (see the solid line in FIG. 1) reflected at the first reflecting mirror 331 after being reflected by the beam splitter 31 and transmitted through the beam splitter 31 and the laser light (see the dashed line in FIG. 1) reflected by the second reflecting mirror 332 after being transmitted through the beam splitter 31 and reflected by the beam splitter 31. The image sensor 35 includes, for example, an image sensor (CMOS (Complementary Metal-Oxide-Semiconductor) or a Charged-Coupled Devices (CCD). The image sensor 35 is configured to image the incident laser light. Further, the image sensor 35 is configured to acquire the image by the laser light. Specifically, the image sensor 35 is configured to acquire the image by the interference light as a plurality of still images 60 while shifting one of the phases of the laser light interfered in the speckle-shearing interferometer 3.

The condenser lens 34 is arranged between the beam splitter 31 and the image sensor 35 to focus the laser light transmitted through the beam splitter 31 (see the solid line in FIG. 1) and the laser light (see the dashed line in FIG. 1) reflected by the beam splitter 31.

The laser light (see the solid line in FIG. 1) reflected at the position 741 on the surface of the inspection target 7 and reflected by the first reflecting mirror 331 and the laser light (see the dashed line in FIG. 1) reflected at the position 742 on the surface of the inspection target 7 and reflected by the second reflecting mirror 332 interfere with each other and are incident on the same point of the image sensor 35. The position 741 and the position 742 are spaced apart from each other by a minute distance. Further, in the same manner, the laser light reflected at mutually different positions at positions of each region of the inspection target 7 is guided by the speckle-shearing interferometer 3 and incident on the image sensor 35.

The control unit 4 operates the phase shifter 32 disposed in the speckle-shearing interferometer 3 with an actuator (not shown) to change the phase of the transmitting laser light. This changes the phase difference between the laser light reflected at the position 741 and the laser light reflected at the position 742. Each detecting element of the image sensor 35 detects the intensity of the interference light in which these two laser light interfered.

The control unit 4 controls the timings of the vibration of the vibrator 1 and the irradiation of the laser light of the laser illumination unit 2 via the signal generator 5, and capture a plurality of still images 60 (see FIG. 2) while changing the phase shift amount. For example, the control unit 4 changes the phase shift amount by λ/4. For example, the control unit 4 sets the irradiation timing of the laser light to T/8. Note that "T" denotes a period of the vibration of the vibrator 1. At each phase shift amount (0, λ/4, λ/2, 3λ/4), the control unit 4 captures a total of 37 still images 60 of 32 still images 60 for the timing j (j=0 to 7) of the laser irradiation and 5 still images 60 at the turn-off state before and after each phase shift amount (0, λ/4, λ/2, 3λ/4). Note that "k" denotes a wavelength of the laser light L.

The control unit 4 processes the detection signal from each detecting element in the following procedures and acquires a moving image 61 (see FIG. 2) representing the vibration status. That is, the control unit 4 acquires the vibration state based on the plurality of still images 60 captured by the image sensor 35 and generates the moving image 61 related to the propagation of the elastic wave of the inspection target 7. Specifically, the control unit 4 calculates the phase of the interference light based on the plurality of still images 60. The control unit 4 generates a moving image 61 related to the propagation of the elastic wave of the inspection target 7 by acquiring the vibration state of the inspection target 7, based on the phase of the calculated interference light.

The control unit 4 acquires the optical phase (the phase difference between two optical paths when the phase shift amount is zero) $\Phi j$ by Equation (1) from the luminance values Ij0 to Ij3 of the still images 60 (each four sheets) which are the same in the timing j (j=0 to 7) of the laser irradiation and different in the phase shift amount by λ/4.

$$\Phi j = -\arctan\{(Ij3-Ij1)/(Ij2-Ij0)\} \quad (1)$$

Further, the control unit 4 performs the sine wave approximation on the optical phase $\Phi j$ by a least-squares method to acquire the approximation coefficients A, θ, and C in Expression (2).

$$\Phi j = A \cos(\theta + j\pi/4) + C = B \exp(j\pi/4) + C \quad (2)$$

where B is a complex amplitude and is expressed by Expression (3).

$$B = A \exp(i\theta): \text{complex amplitude} \quad (3)$$

Here, the complex amplitude B is image information (two-dimensional spatial information on the complex amplitude) that is the basis for outputting the moving image 61 representing the vibration state. Further, the control unit 4 configures a moving image (30 to 60 frames) displaying the optical phase change at each phase time ξ (0≤ξ<2π) of the vibration, from the approximate expression acquired by excluding the constant term C from Equation (2), and outputs it as a moving image 61 representing the vibration state. In the above processes, a spatial filter may be appropriately applied for the complex amplitude B for noise elimination.

The control unit 4 detects the discontinuous region of the vibration state in the above-described moving image 61 as a defective portion 73 of the inspection target 7. The control unit 4 is configured to apply a spatial filter of extracting and emphasizing the discontinuous portion of the vibration state and extract the discontinuous portion of the vibration state based on the moving image 61 related to the propagation of the elastic wave of the inspection target 7.

Here, there is a case in which a region in which the light quantity of the interfered laser light is insufficient or excessive may occur due to the occurrence of variations in the light quantity of the laser light blocked or reflected by the shape or the surface condition of the inspection target 7. Further, there also is a case in which a region 82 in which the light quantity of the laser light relatively interfered by the disturbance light becomes insufficient or excessive may occur. In such a region 82, the vibration state in the inspection target 7 cannot be correctly acquired. Therefore, in the first embodiment, as shown in FIG. 2, the control unit 4 is configured such that the measurement inappropriate region 80 in which the vibration state has not been correctly acquired is identified based on the imaging result by the image sensor 35 and the measurement inappropriate region 80 is displayed in such a manner as to be distinguishable from the measurement appropriate region 81 in which the vibration state has been correctly acquired in the moving image 61.

Specifically, the control unit 4 is configured to perform control to identify the region 82 in which the light quantity of the interfered laser light acquired by the image sensor 35 becomes insufficient or excessive to correctly acquire the vibration state by the control unit 4 as a measurement inappropriate region 80. More specifically, the control unit 4 is configured to perform control to identify the region 82 in which the luminance value in each of the plurality of still images 60 is smaller than a first threshold, as a measurement inappropriate region 80. Alternatively, the control unit 4 is configured to perform control to identify a region 82 in which the luminance value in each of the plurality of still images 60 is greater than a second threshold which is greater than the first threshold, as a measurement inappropriate region 80. Note that the region 82 in which the luminance value in each of the plurality of still images 60 is smaller than the first threshold is a region 82 in which the light quantity of the laser light is insufficient. Further, the region 82 in which the luminance value in each of the plurality of still images 60 is greater than the second threshold is a region 82 in which the light quantity of the laser light has been saturated.

Further, in the first embodiment, as shown in FIG. 2, the control unit 4 is configured to display the measurement inappropriate region 80 so that the measurement inappropriate region 80 and the measurement appropriate region 81 can be distinguished by displaying the measurement inappropriate region 80 with a color different from the color of the measurement appropriate region 81. In the example shown in FIG. 2, the hatching in the measurement inappropriate region 80 represents the difference in color between the measurement inappropriate region 80 and the measurement appropriate region 81.

The display unit 6 displays the moving image 61, which represents the vibration state of the inspection target 7 generated by the control unit 4. The display unit 6 includes a liquid crystal display, an organic EL (Electro-Luminescence) display, or the like.

The inspection target 7 is a coated steel sheet in which a coating film 72 is coated on a surface of a steel sheet 71. The defective portion 73 includes cracks and peelings.

(Measurement Inappropriate Region Display Processing)

Next, referring to FIG. 3, the measurement inappropriate region display processing by the defect inspection apparatus 100 according to the first embodiment will be described based on a flowchart. Note that the measurement inappropriate region indication processing is performed by the control unit 4.

Figure 3:
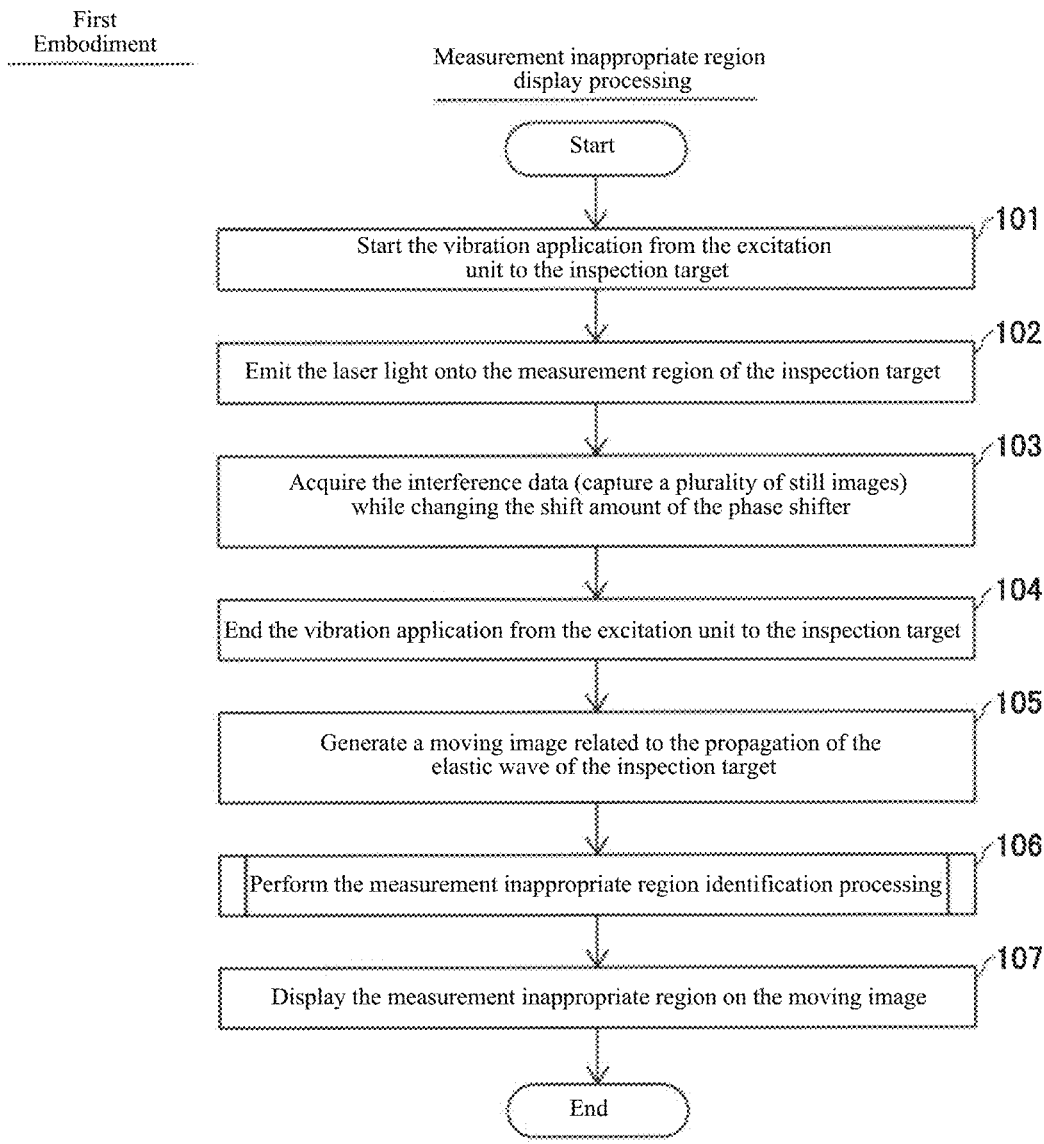
FIG. 3 is a flowchart for explaining a measurement inappropriate region display processing by a control unit of a defect inspection apparatus according to a first embodiment.

In Step 101 of FIG. 3, the vibration application from the vibrator 1 to the inspection target 7 is started. With this, an elastic wave is excited to the inspection target 7. In Step 102, laser light is emitted from the laser illumination unit 2 to the measurement region of the inspection target 7.

In Step 103, image data by the interference light is acquired while changing the shift amount of the phase shifter 32. That is, the image by the interference light interfered with the phase differentiated is captured as a plurality of still images 60. With this, the phase shifter 32 of the speckle-shearing interferometer 3 is operated in such a manner that the phase of the laser light is changed by λ/4, and the intensity of the interference light of the laser light at each phase is detected (imaged) by the image sensor 35.

In Step 104, the vibration application from the vibrator 1 to the inspection target 7 is completed. In Step 105, a moving image 61 related to the propagation of the elastic wave of the inspection target 7 is generated.

In Step 106, a measurement inappropriate region 80 is identified based on the plurality of still images 60. In Step 107, the measurement inappropriate region 80 is superimposed on the moving image 61. Thereafter, the measurement inappropriate region display processing is terminated.

(Measurement Inappropriate Region Identification Processing)

Next, referring to FIG. 4, the measurement inappropriate region identification processing (processing in Step 106 of FIG. 3) by the defect inspection apparatus 100 according to the first embodiment will be described based on a flowchart. Note that the identification processing of a measurement inappropriate region is performed by the control unit 4.

Figure 4:
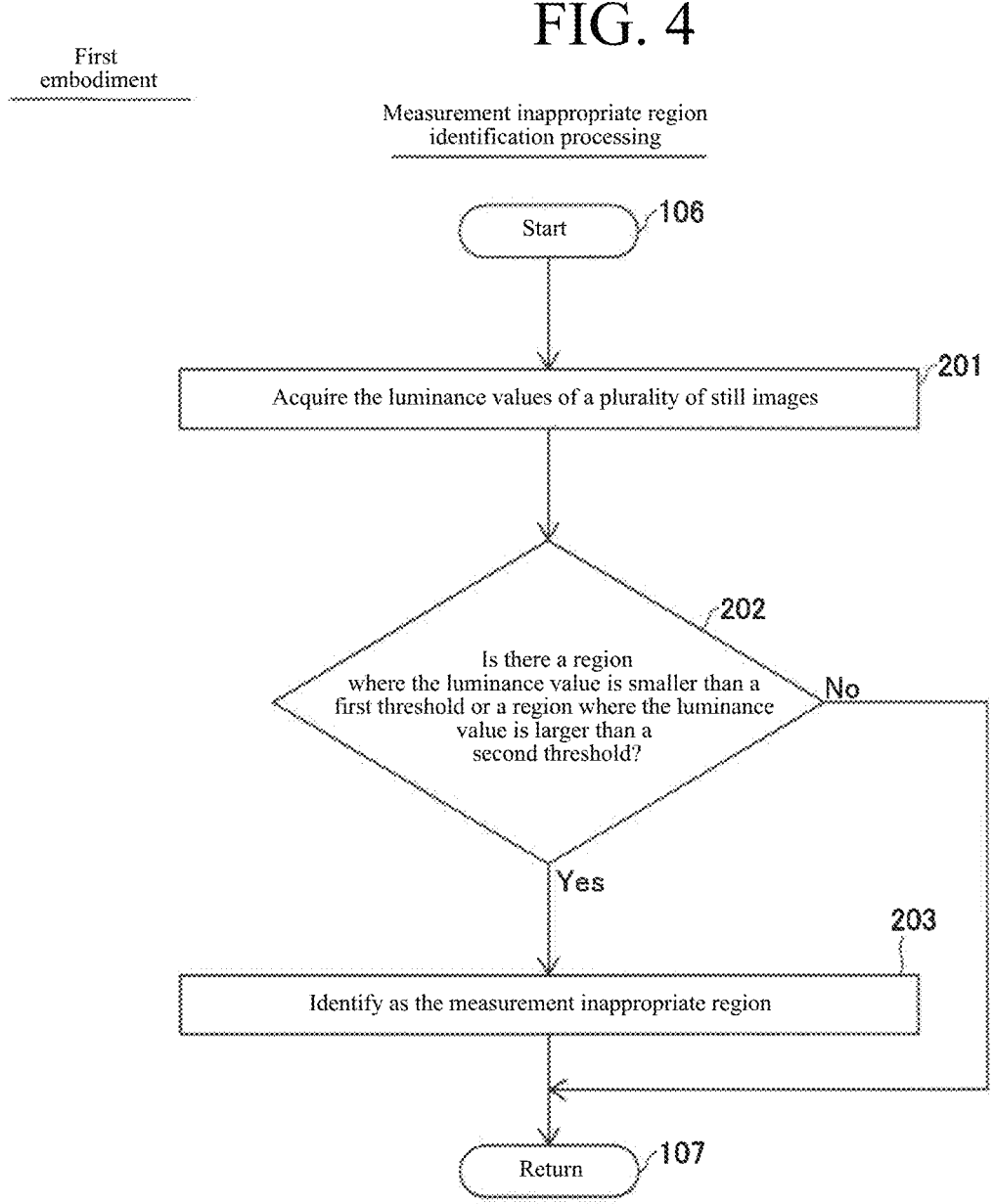
FIG. 4 is a flowchart for explaining a measurement inappropriate region identification processing by a control unit of a defect inspection apparatus according to a first embodiment.

In Step 201 of FIG. 4, the luminance value of the plurality of still images 60 is acquired. In Step 202, it is determined whether or not there is a region 82 in which the luminance value is smaller than the first threshold or a region 82 in which the luminance value is greater than the second threshold. In the plurality of still images 60, in a case where there is a region 82 in which the luminance value is smaller than the first threshold or a region 82 in which the luminance value is greater than the second threshold, the processing proceeds to Step 203. In the plurality of still images 60, in a case where there is no region 82 in which the luminance value is smaller than the first threshold or there is no region 82 in which the luminance value is greater than the second threshold, the processing proceeds to Step 107, and the measurement inappropriate region identification processing is terminated. Note that in the processing of Step 202, as the luminance value used for determination, the luminance value of each of the plurality of still images 60 is used.

In Step 203, the region in which the luminance value is smaller than the first threshold or the region 82 in which the luminance value is greater than the second threshold is identified as a measurement inappropriate region 80. Thereafter, the processing proceeds to Step 107, and the measurement inappropriate region identification processing is terminated.

Effects of First Embodiment

In this first embodiment, the following effects can be obtained.

In the first embodiment, as described above, the defect inspection apparatus is provided with the vibrator 1, the laser illumination unit 2, the speckle-shearing interferometer 3, the image sensor 35, and the control unit 4. The vibrator 1 excites an elastic wave to the inspection target 7. The laser illumination unit 2 emits laser light to the inspection target 7. The speckle-shearing interferometer 3 causes the laser light reflected at different positions of the inspection target 7 excited by the vibrator 1 to interfere with each other. The image sensor 35 acquires an image by the interfered laser light. The control unit 4 acquires the vibration state based on the plurality of still images 60 acquired by the image sensor 35 to generate the moving image 61 related to the propagation of the elastic wave of the inspection target 7. The control unit 4 is configured to perform control to identify the measurement inappropriate region 80 in which the vibration state has not been correctly acquired, based on the imaging result by the image sensor 35. Further, the control unit 4 is configured to perform control to display the measurement inappropriate region 80 in such a manner as to be distinguishable from the measurement appropriate region 81 in which the vibration state has been correctly acquired, in the moving image 61. As a result, the user can confirm the moving image 61 in which the measurement inappropriate region 80 and the measurement appropriate region 81 are displayed so as to be distinguishable from each other. Therefore, the user can easily identify and grasp the measurement inappropriate region 80 and the measurement appropriate region 81 in the moving image 61. As a result, the user can easily grasp whether or not the measurements for each measurement region of the inspection target 7 have been correctly performed. Further, the user can also easily identify the measurement inappropriate region 80, based on the imaging result by the image sensor 35. Thus, the measurement inappropriate region 80 and the measurement appropriate region 81 can be distinguished from each other. Therefore, in the measurement inappropriate region 80, it is possible to suppress that the defective portion 73 in which the propagation of the elastic wave has not been correctly observed is erroneously determined as a normal portion. Further, the user can make a determination as to whether or not to retake the measurement according to the size of the measurement inappropriate region 80 or the like.

Further, in the first embodiment, as described above, the control unit 4 is configured to perform control to identify the region 82 in which the light quantity of the interfered laser light acquired by the image sensor 35 is insufficient or excessive to correctly acquire the vibration state by the control unit 4, as a measurement inappropriate region 80. With this, in a case where a region 82 in which the light quantity of the interfered laser light in the measurement region is insufficient or excessive has occurred due to the shape or the surface condition of the inspection target 7, it is possible to identify the region 82 as a measurement inappropriate region 80.

In the first embodiment, as described above, the control unit 4 is configured to perform control to specify the region 82 in which the luminance value in each of the plurality of still images 60 is smaller than the first threshold or the region 82 in which the luminance value in each of the plurality of still images 60 is larger than the second threshold which is larger than the first threshold, as a measurement inappropriate region 80. With this, it is possible to easily identify the region 82 in which each luminance value of the plurality of still images 60 is smaller than the first threshold as a measurement inappropriate region 80 which is a region 82 in which the light quantity is insufficient. Further, it is also possible to easily identify the region 82 in which each luminance value of the plurality of still images 60 is greater than the second threshold as a measurement inappropriate region 80 which is a region 82 in which the light quantity of the laser light is saturated.

Further, in the first embodiment, as described above, the control unit 4 is configured to display the measurement inappropriate region 80 with a color different from the color of the measurement appropriate region 81 so as to be distinguishable between the measurement inappropriate region 80 and the measurement appropriate region 81. As a result, the measurement inappropriate region 80 and the measurement appropriate region 81 are displayed in different colors, the user can easily visually distinguish between the measurement inappropriate region 80 and the measurement appropriate region 81.

Second Embodiment

Figure 5:
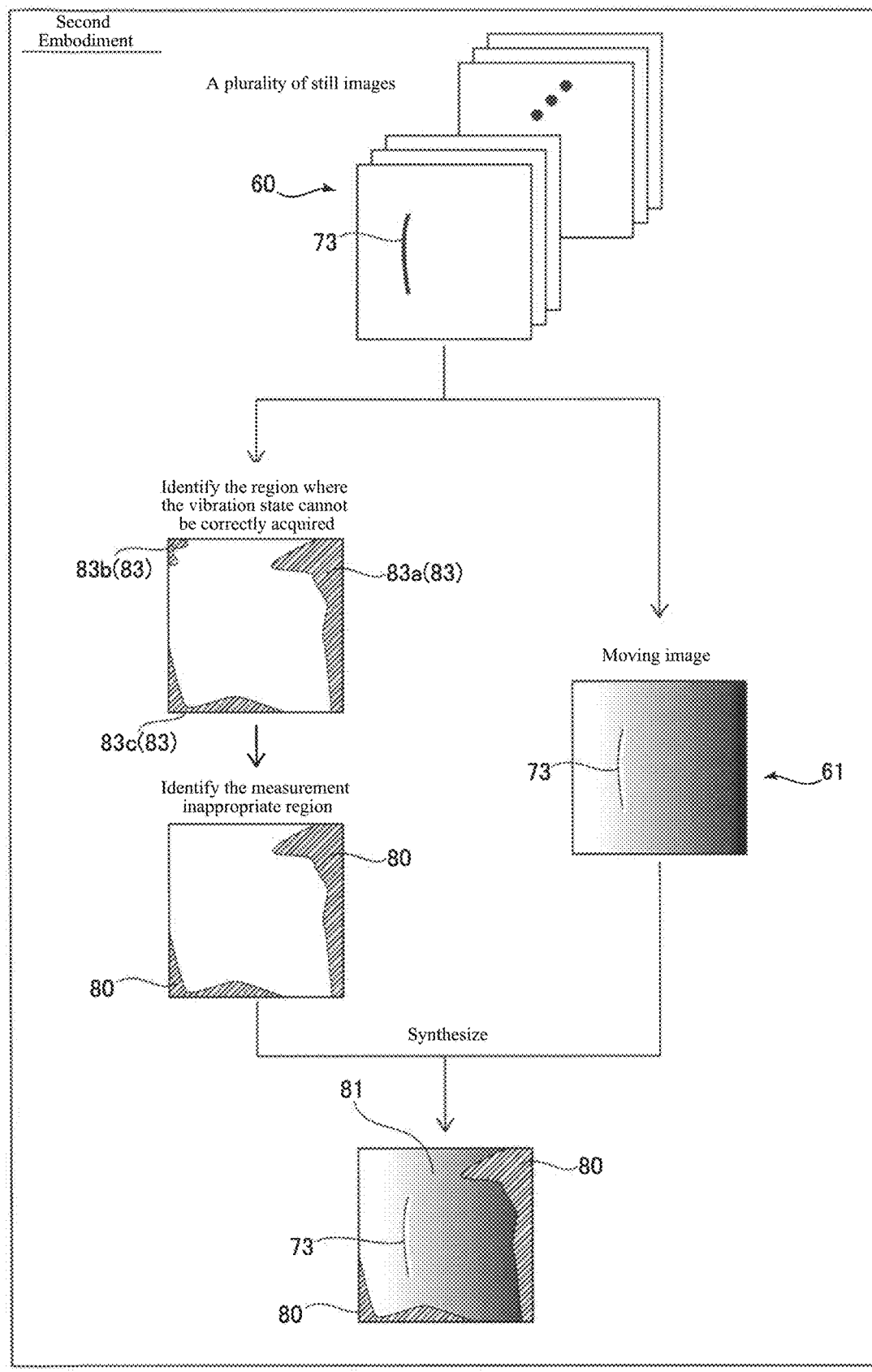
FIG. 5 is a diagram for explaining the displaying of a measurement inappropriate region of a defect inspection apparatus according to a second embodiment.

Next, referring now to FIGS. 1 and 5, a defect inspection apparatus 100 according to a second embodiment (see FIG. 1) will be described. Unlike the above-described first embodiment in which the control unit 4 identifies the region 82 in which the light quantity of the interfered laser light is insufficient or excessive, the second embodiment is configured as follows. That is, the control unit 4 is configured to identify the region 83 (see FIG. 5) in which the vibration state has not been correctly acquired due to vibrations from other than the vibrator 1 as a measurement inappropriate region 80. Note that the same component as that of the above-described first embodiment is denoted by the same reference symbol, and the description thereof will be omitted.

Here, due to vibrations from other than the vibrator 1, there may be a case in which a region 83 in which the vibration state has not being acquired correctly may occur. Therefore, as shown in FIG. 5, in the second embodiment, it is configured such that the region 83 in which the vibration state has not been correctly acquired is identified as a measurement inappropriate region 80. Specifically, the control unit 4 determines whether or not the luminance change rate to the average luminance in each pixel of the plurality of still images 60 has been reduced, based on the plurality of still images 60. The control unit 4 is configured to perform control to specify the region 83 in which the luminance change rate to the average luminance in each pixel of the plurality of still images 60 has been reduced, as a measurement inappropriate region 80.

The control unit 4 acquires the intensity D (average luminance) of the background light and the amplitude E of the intensity of the interference light shown in Equations (4) and (5) below from the luminance value Ij0 to Ij3 of the still images 60 (four sheets each) which are the same in the timing j (j=0 to 7) of the laser irradiation and different in the phase shift amount by λ/4. Further, the control unit 4 acquires the interference degree F. (=E/D) shown in the following Equation (6) from the intensity D of the background and the amplitude E of the interference light.

$$D=(Ij0+Ij1+Ij2+Ij3)/4 \tag{4}$$

$$E=\frac{1}{2}\times\{(Ij2-Ij1)+(Ij0-Ij3)\}^{\frac{1}{2}} \tag{5}$$

$$F=2\times\{(Ij2-Ij1)+(Ij0-Ij3)\}^{\frac{1}{2}}/(Ij0+Ij1+Ij2+Ij3) \tag{6}$$

Note that in a case where the interference degree F. shown in the above-described Equation (6) becomes low, there is no change in the intensity of the interference light even if the phase of the laser light that transmits through the phase shifter 32 is changed, and therefore the vibration state cannot be acquired correctly. Therefore, the control unit 4 is configured to perform control to specify the measurement inappropriate region 80, based on the magnitude of interference degree F. Specifically, the control unit 4 is configured to perform control to identify the region 83 in which the interference degree F. is smaller than a predetermined third threshold as a measurement inappropriate region 80. Further, there are a case in which the interference degree F. is deteriorated due to the vibration from other than the vibrator 1 and a case in which the interference degree F. is deteriorated due to the amplitude increase at the defective portion 73 in the inspection target 7 excited by the vibrator 1. Note that the interference degree F. denotes a luminance change rate to an average luminance in each pixel of the plurality of still images 60.

Further, in the second embodiment, the control unit 4 is configured to perform control to discriminate between the measurement inappropriate region 80 and the defective portion 73, based on the size of the region 83 in which the interference degree F. has been reduced. Further, the control unit 4 is configured to perform control to specify the region 83 in which the interference degree F. has been deteriorated is larger than a predetermined size as a measurement inappropriate region 80. In the example shown in FIG. 5, between the region 83a where the interference degree F. has been deteriorated, the region 83b where the interference degree F. has been deteriorated, and the region 83c where the interference degree F. has been deteriorated, the size of the region 83b in which the interference degree F. has been deteriorated is smaller than the size of the defective portion 73. Therefore, the control unit 4 identifies the region 83a in which the interference degree F. has been deteriorated and the region 83c in which the interference degree F. has been deteriorated, as measurement inappropriate regions 80.

Further, in the second embodiment, the control unit 4 is configured to perform control to display that the measurement itself has not been established when the ratio of the measurement inappropriate region 80 to the entire imaging region exceeds a predetermined value.

Referring to FIG. 6, the measurement inappropriate region identification processing according to the defect inspection apparatus 100 of the second embodiment (processing in Step 106 of FIG. 3) will be described based on a flowchart. Note that the measurement inappropriate region identification processing is performed by the control unit 4.

In Step 301 of FIG. 6, based on the luminance value of the plurality of still images 60, the interference degree F. shown in the above-described Equation (6) is acquired. At Step 302, it is determined whether or not there is a region 83 in which the interference degree F. is lower than a predetermined third threshold. When there is a region 83 in which the interference degree F. is lower than the predetermined third threshold, the processing proceeds to Step 303. When there is no region 83 in which the interference degree F. is lower than the third threshold, the processing proceeds to Step 107 and measurement inappropriate region identification processing is terminated.

In Step 303, it is determined whether or not the size of the region 83 in which the interference degree F. is smaller than the third threshold. When the size of the region 83 in which the magnitude of the interference degree F. is smaller than the third threshold, the processing proceeds to Step 304. When the size of the region 83 in which the magnitude of the interference degree F. is smaller than the third threshold is smaller than the predetermined size, the processing proceeds to Step 107, and the measurement inappropriate region identification processing is terminated.

In Step 304, the region 83 in which the interference degree F. is lower than the third threshold is identified as a measurement inappropriate region 80. Thereafter, the processing proceeds to Step 107, and the measurement inappropriate region identification processing is terminated.

Note that the rest of the configuration of the second embodiment is the same as that of the first embodiment.

Effects of Second Embodiment

In this second embodiment, the following effects can be obtained.

In the second embodiment, as described above, the control unit 4 is configured to perform control to specify whether or not the interference degree F. has been reduced based on the plurality of still images 60, and the region 83 in which the interference degree F. has been deteriorated is identified as a measurement inappropriate region 80. With this, in a case where the interference degree F. has been deteriorated due to the application of vibrations to the inspection target 7 from other than the vibrator 1, and a region 83 in which the vibration state has not been correctly acquired in the measurement region has occurred, the control unit 4 can identify the region 83 in which the vibration state has not been correctly acquired, as a measurement inappropriate region 80.

In the second embodiment, as described above, the control unit 4 is configured to perform control to specify the region in which the interference degree F. is smaller than the predetermined third threshold as a measurement inappropriate region 80. As a result, it is possible to easily specify that the region in which the interference degree F. is lower than the predetermined third threshold as a measurement inappropriate region 80.

Further, in the second embodiment, as described above, the control unit 4 is configured to perform control to discriminate between the measurement inappropriate region 80 and the measurement appropriate region 81 based on the size of the region 83 in which the interference degree F. has been deteriorated. With this, it is possible to suppress region 83 that the region 83 in which the interference degree F. is locally deteriorated is determined as a measurement inappropriate region 80, and therefore it is possible to suppress overlooking a defective portion 73.

Further, in the second embodiment, as described above, the control unit 4 is configured to perform control to identify the region in which the interference degree has been deteriorated as a measurement inappropriate region 80 when the size of the region 83 is larger than a predetermined size. A region in which the interference degree decreases due to vibrations from other than the vibrator 1 is usually larger than the size of the defective portion 73. Therefore, by configuring as described above, it is possible to easily identify the measurement inappropriate region 80 by comparing the size of the region 83 in which the interference degree F. has been deteriorated with a predetermined size. Consequently, in a case where the interference degree F. has been reduced by the increase in the amplitude at the defective portion 73 due to the vibrations excited to the inspection target 7, it is possible to suppress that the defective portion 73 is determined as a measurement inappropriate region 80.

Further, in the second embodiment, as described above, the control unit 4 is configured to perform the control for indicating that the measurement itself has not been established when the ratio of the measurement inappropriate region 80 to the entire imaging region exceeds a predetermined value. As a result, since it is displayed that the measurement itself has not been established, the user can easily recognize that the measurement has not been established. As a result, the usability of the user can be improved.

The other effects of the second embodiment are the same as those of the above-described first embodiment.

Modified Embodiment

It should be understood that the embodiments disclosed here are examples in all respects and are not restrictive. The scope of the present invention is indicated by the appended claims rather than by the descriptions of the above-described embodiments and includes all modifications (changes) within the meanings and the scopes equivalent to the claims.

For example, the above first embodiment shows an example is shown in which it is configured such that even in a case where there is one still image having a region in which the luminance value is smaller than the first threshold and a region in which the luminance value is larger than the second threshold among a plurality of still images, the control unit identifies it as a measurement inappropriate region, but the present invention is not limited thereto. For example, among the plurality of still images, even in a case where there is a still image having a region in which the luminance value is smaller than the first threshold or a region in which the luminance value is larger than the second threshold, if the still image having a region in which the luminance value is smaller than the first threshold or a region in which the luminance value is greater than the second threshold is equal to or less than a predetermined number, it may not be identified as a measurement inappropriate region. That is, among the plurality of still image, in all still images, even in cases where the luminance value does not fall within the range equal to or more than the first threshold or equal to or less than the second threshold, it may not be identified as a measurement inappropriate region.

Further, in the above-mentioned first and second embodiments, an example is shown in which it is configured such that the control unit performs identification processing of a measurement inappropriate region by using a luminance value of each of the plurality of still images, but the present invention is not limited thereto. For example, the control unit may be configured to acquire an average luminance value from a plurality of still images and perform identification processing of a measurement inappropriate region by using the acquired average luminance value.

Further, in the first and second embodiments described above, an example is shown in which it is configured such that the control unit extracts the defective portion, but the present invention is not limited thereto. The control unit is not required to extract a defective portion if a measurement inappropriate region is specified.

Further, in the above-described first and second embodiments, an example is shown in which it is configured such that the signal generator, the vibrator (excitation unit), and the laser illumination unit are connected via cables (wired), but the present invention is not limited thereto. In the present invention, the signal generator, the excitation unit, and the laser illumination unit may be wirelessly connected.

Further, in the above-mentioned first and second embodiments, an example is shown in which a speckle-shearing interferometer is used as the interference unit, but the present invention is not limited thereto. In the present invention, other optical interferometers may be used as the interference unit.

Further, in the first and second embodiments, an example is shown in which the vibrator (excitation unit) is used in such a manner as to be in contact with the surface of the inspection target, but the present invention is not limited thereto. In the present invention, an excitation unit may be used so as to be spaced apart from the inspection target surface. For example, a strong speaker or the like may be used as the excitation unit.

Further, in the first and second embodiments, an example is shown in which the phase shift amount is changed by $\lambda/4$ and the step of the laser irradiation timing is changed by T/8, but the present invention is not limited to this. The step of the phase shift amount and the laser light radiation timing may be a value different from the above. In this case, the calculation expression is different from the above-described Equations (1) to (3).

Further, in the present invention, on the optical path until the reflected light from the inspection target is incident on the imaging unit (image sensor), for the purpose of protecting the optical component and improving the SN ratio of the device, etc., windows, or various optical filters may be arranged.

Further, in the first and second embodiments, for convenience of explanation, the processing operation of the control unit according to the present invention has been described using a flowchart of a flow-driven type which performs processing in order along the processing flow, but the present invention is not limited thereto. In the present invention, the processing operation by the control unit 4 may be performed by an event-driven type processing that executes processing on an event-by-event basis. In this case, the processing of the control unit may be performed in a complete event-driven fashion or in combination of event-driven type processing and flow-driven type processing.

DESCRIPTION OF SYMBOLS

1: Vibrator (excitation unit)
2: Laser illumination unit
3: Speckle-shearing interferometer (interference unit)
4: Control unit
7: Inspection target
35: Image sensor (imaging unit)
60: Still image
61: Moving Image
73: Defective portion
80: Measurement inappropriate region
81: Measurement appropriate region
82, 82a, 82b, 82c: Region in which light quantity of the interfered laser light is insufficient or excessive
83, 83a, 83b, 83c: Region in which the vibration status has not been acquired correctly
100: Defect inspection apparatus
F: Interference degree (luminance change rate for an average luminance in each pixel of a plurality of still images)

The invention claimed is:
1. A defect inspection apparatus comprising:
an excitation unit configured to excite an elastic wave to an inspection target;
a laser illumination unit configured to emit laser light onto the inspection target;
an interference unit configured to cause laser light reflected at different positions of the inspection target excited by the excitation unit to interfere with each other;
an imaging unit configured to acquire an image of the interfered laser light; and
a control unit configured to acquire a vibration state based on a plurality of still images acquired by the imaging unit and generate a moving image related to propagation of an elastic wave of the inspection target,
wherein the control unit is configured to perform control to identify a measurement inappropriate region in which the vibration state has not been correctly acquired, based on an imaging result by the imaging unit and display the measurement inappropriate region in such a manner as to be distinguishable from a measurement appropriate region, and
wherein the control unit is configured to perform control to identify a region in which a light quantity of the interfered laser light acquired by the imaging unit is insufficient or excessive to correctly acquire the vibration state by the control unit, as the measurement inappropriate region.
2. The defect inspection apparatus as recited in claim 1, wherein the control unit is configured to perform control to identify a region in which a luminance value in each of the plurality of still images is smaller than a first threshold or a region in which a luminance value in each of the plurality of still images is larger than a second threshold which is larger than the first threshold, as the measurement inappropriate region.

3. The defect inspection apparatus as recited in claim 2, wherein the control unit is configured to perform control to determine whether or not a luminance change rate with respect to an average luminance in each pixel of the plurality of still images has been reduced based on the plurality of still images and identify a region in which the luminance change rate has been reduced, as the measurement inappropriate region.

4. The defect inspection apparatus as recited in claim 3, wherein the control unit is configured to perform control to identify a region in which the luminance change rate is smaller than a predetermined threshold, as the measurement inappropriate region.

5. The defect inspection apparatus as recited in claim 3, wherein the control unit is configured to perform control to discriminate between the measurement inappropriate region and the measurement appropriate region, based on a size of the region in which the luminance change rate has been reduced.

6. The defect inspection apparatus as recited in claim 5, wherein the control unit is configured to perform control to identify the region in which the luminance change rate has been reduced is larger than a predetermined size, as the measurement inappropriate region when the size of the region in which the luminance change rate has been reduced is larger than the predetermined size.

7. The defect inspection apparatus as recited in claim 2, wherein the control unit is configured to display the measurement inappropriate region and the measurement appropriate region in such a manner as to be distinguishable by displaying the measurement inappropriate region with a color different from a color of the measurement appropriate region.

8. The defect inspection apparatus as recited in claim 2, wherein the control unit is configured to perform control to display that a measurement itself has not been established when a ratio of the measurement inappropriate region to an entire imaging region has exceeded a predetermined value.

9. The defect inspection apparatus as recited in claim 1, wherein the control unit is configured to perform control to determine whether or not a luminance change rate with respect to an average luminance in each pixel of the plurality of still images has been reduced based on the plurality of still images and identify a region in which the luminance change rate has been reduced, as the measurement inappropriate region.

10. The defect inspection apparatus as recited in claim 9, wherein the control unit is configured to perform control to identify a region in which the luminance change rate is smaller than a predetermined threshold, as the measurement inappropriate region.

11. The defect inspection apparatus as recited in claim 10, wherein the control unit is configured to perform control to discriminate between the measurement inappropriate region and the measurement appropriate region, based on a size of the region in which the luminance change rate has been reduced.

12. The defect inspection apparatus as recited in claim 11, wherein the control unit is configured to perform control to identify the region in which the luminance change rate has been reduced is larger than a predetermined size, as the measurement inappropriate region when the size of the region in which the luminance change rate has been reduced is larger than the predetermined size.

13. The defect inspection apparatus as recited in claim 9, wherein the control unit is configured to perform control to discriminate between the measurement inappropriate region and the measurement appropriate region, based on a size of the region in which the luminance change rate has been reduced.

14. The defect inspection apparatus as recited in claim 13, wherein the control unit is configured to perform control to identify the region in which the luminance change rate has been reduced is larger than a predetermined size, as the measurement inappropriate region when the size of the region in which the luminance change rate has been reduced is larger than the predetermined size.

15. The defect inspection apparatus as recited in claim 9, wherein the control unit is configured to display the measurement inappropriate region and the measurement appropriate region in such a manner as to be distinguishable by displaying the measurement inappropriate region with a color different from a color of the measurement appropriate region.

16. The defect inspection apparatus as recited in claim 9, wherein the control unit is configured to perform control to display that a measurement itself has not been established when a ratio of the measurement inappropriate region to an entire imaging region has exceeded a predetermined value.

17. The defect inspection apparatus as recited in claim 1, wherein the control unit is configured to display the measurement inappropriate region and the measurement appropriate region in such a manner as to be distinguishable by displaying the measurement inappropriate region with a color different from a color of the measurement appropriate region.

18. The defect inspection apparatus as recited in claim 1, wherein the control unit is configured to perform control to display that a measurement itself has not been established when a ratio of the measurement inappropriate region to an entire imaging region has exceeded a predetermined value.

19. A defect inspection method comprising:
exciting an elastic wave to an inspection target;
irradiating the inspection target with laser light;
causing laser light reflected at mutually different positions of the excited inspection target to interfere with each other;
acquiring an image by the interfered laser light;
acquiring a vibration state based on a captured still image and generating a moving image related to propagation of the elastic wave of the inspection target;
identifying a measurement inappropriate region in which the vibration state has not been correctly acquired, based on an imaging result;
displaying the measurement inappropriate region in the moving image in such a manner as to be distinguishable from a measurement appropriate region; and
performing control to identify a region in which a light quantity of the interfered laser light acquired by the imaging unit is insufficient or excessive to correctly acquire the vibration state by the control unit, as the measurement inappropriate region.

* * * * *